(12) United States Patent
Meng et al.

(10) Patent No.: US 7,618,148 B2
(45) Date of Patent: Nov. 17, 2009

(54) PROJECTOR APPARATUS HAVING GROUNDING COMPONENTS FOR PROTECTION AGAINST ELECTROMAGNETIC INTERFERENCE

(75) Inventors: Chi-Yu Meng, Chu Nan (TW);
Chin-Long Tien, Chu Nan (TW);
Jung-Chi Chen, Chu Nan (TW);
Ying-Yuan Shen, Chu Nan (TW)

(73) Assignee: Coretronic Corporation, Chu Nan, Miao Li County (TW)

( * ) Notice: Subject to any disclaimer, the term of this patent is extended or adjusted under 35 U.S.C. 154(b) by 527 days.

(21) Appl. No.: 11/473,017

(22) Filed: Jun. 23, 2006

(65) Prior Publication Data
US 2007/0008506 A1 Jan. 11, 2007

(30) Foreign Application Priority Data
Jul. 8, 2005 (TW) .............................. 94125580 A

(51) Int. Cl.
*G03B 21/14* (2006.01)
*H05K 9/00* (2006.01)
*G11B 33/14* (2006.01)

(52) U.S. Cl. .......................... 353/119; 353/69; 361/818; 720/650

(58) Field of Classification Search ................ 353/119, 353/20, 69; 348/820; 720/650; 361/818
See application file for complete search history.

(56) References Cited

U.S. PATENT DOCUMENTS

| 6,637,895 | B2 * | 10/2003 | Fujimori et al. | ............. 353/119 |
| 6,871,964 | B2 * | 3/2005 | Peng | .......................... 353/119 |
| 6,976,760 | B2 * | 12/2005 | Ito et al. | ....................... 353/61 |
| 7,052,144 | B2 * | 5/2006 | Nakamura | .................... 353/61 |
| 2004/0041985 | A1 * | 3/2004 | Kimura et al. | ................ 353/70 |
| 2004/0174503 | A1 * | 9/2004 | Peng | ......................... 353/119 |
| 2004/0189951 | A1 * | 9/2004 | Ogawa | ........................ 353/20 |
| 2004/0218151 | A1 * | 11/2004 | Ito et al. | ....................... 353/57 |

FOREIGN PATENT DOCUMENTS

| JP | 2003-274318 | * | 9/2003 |
| JP | 2004-423886 | * | 5/2004 |

* cited by examiner

*Primary Examiner*—Diane I Lee
*Assistant Examiner*—Jori S Byrne-Diakun
(74) *Attorney, Agent, or Firm*—Davidson Berquist Jackson & Gowdey LLP

(57) ABSTRACT

A projector apparatus has an electrically conductive housing that includes a lower housing part and an upper housing part coupled to the lower housing part for covering the lower housing part, an internal projector module mounted in the housing, a first grounding component provided between the internal projector module and the upper housing part so as to establish a first grounding path between the internal projector module and the housing, and a second grounding component provided between the internal projector module and the lower housing part so as to establish a second grounding path between the internal projector module and the housing.

10 Claims, 4 Drawing Sheets

PROJECTOR APPARATUS HAVING GROUNDING COMPONENTS FOR PROTECTION AGAINST ELECTROMAGNETIC INTERFERENCE

CROSS-REFERENCE TO RELATED APPLICATION

This application claims priority of Taiwanese Application No. 094125580, filed on Jul. 28, 2005.

BACKGROUND OF THE INVENTION

1. Field of the Invention

The invention relates to a projector apparatus, more particularly to a projector apparatus having grounding components for protection against electromagnetic interference.

2. Description of the Related Art

As shown in FIG. 1 and FIG. 2, a conventional digital light processing (DLP) projector apparatus includes an electrically conductive housing 1 and an optical engine 2. The housing 1 includes a lower housing part 11 and an upper housing part 12 coupled to the lower housing part 11 for covering the lower housing part 11. The optical engine 2 includes a metal engine base 210, a lens unit 220, and a digital micro-mirror device (not shown) mounted behind the lens unit 220. The lens unit 220 is mounted on the engine base 210 proximate to a front end of the lower housing part 11. When the optical engine 2 is activated, electromagnetic noise produced by each internal component of the optical engine 2 can interfere with other internal components or with nearby electronic equipments through conduction or radiation. A conventional solution to reduce the electromagnetic interference attributed to the digital micro-mirror device is to provide a grounding component 3 above the digital micro-mirror device, such that when the upper housing part 12 covers the lower housing part 11, the grounding component 3 is sandwiched between the upper housing part 12 and the digital micro-mirror device so as to establish a grounding path between the digital micro-mirror device and the housing 1. However, other components in the projector apparatus, such as color wheel, lens unit, etc. (not shown), are also sources of electromagnetic interference. Therefore, the effect of reducing the electromagnetic interference attributed to the projector apparatus is unsatisfactory when only the digital micro-mirror device is provided with the grounding component 3 for establishing the grounding path to the housing 1.

SUMMARY OF THE INVENTION

Therefore, the object of the present invention is to provide a projector apparatus having a plurality of grounding components for protection against electromagnetic interference.

According to the present invention, there is provided a projector apparatus comprising an electrically conductive housing that includes a lower housing part and an upper housing part coupled to the lower housing part for covering the lower housing part, an internal projector module mounted in the housing, a first grounding component provided between the internal projector module and the upper housing part so as to establish a first grounding path between the internal projector module and the housing, and a second grounding component provided between the internal projector module and the lower housing part so as to establish a second grounding path between the internal projector module and the housing.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
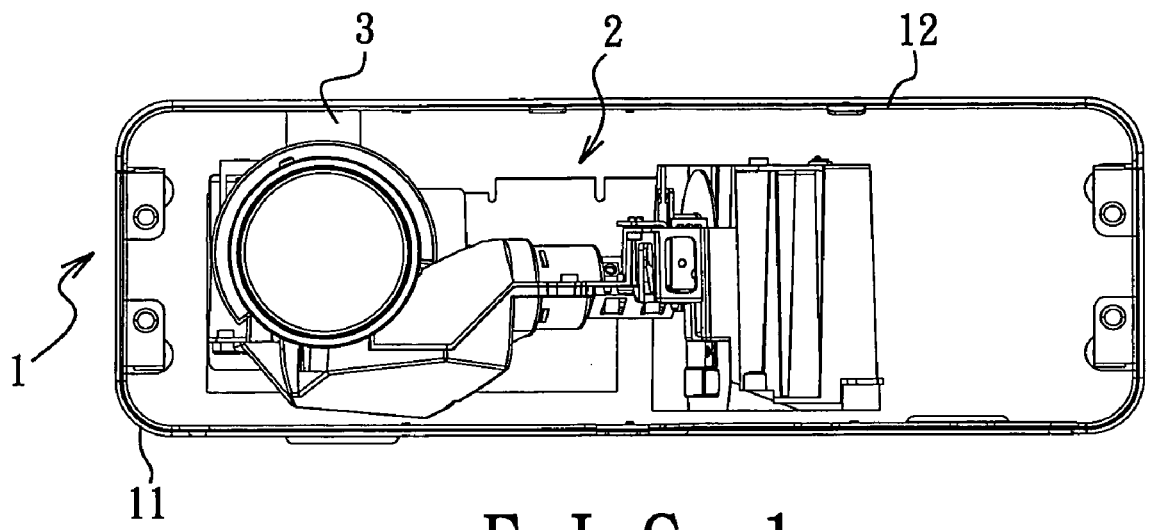
FIG. 1 is a front view of a conventional projector apparatus.
Figure 2:
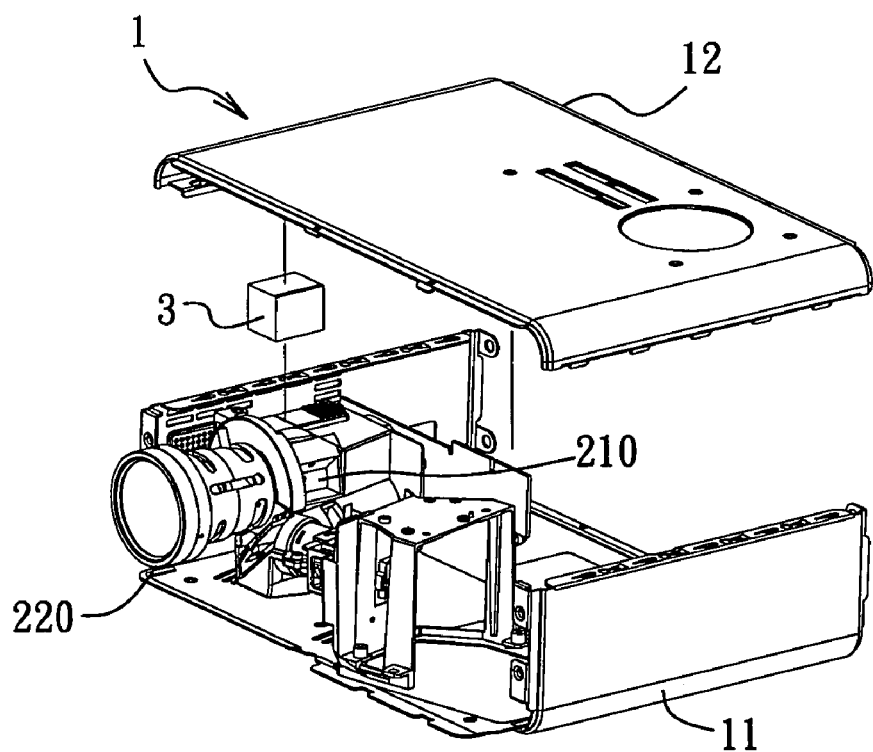
FIG. 2 is a partly exploded perspective view of the conventional projector apparatus.
Figure 3:
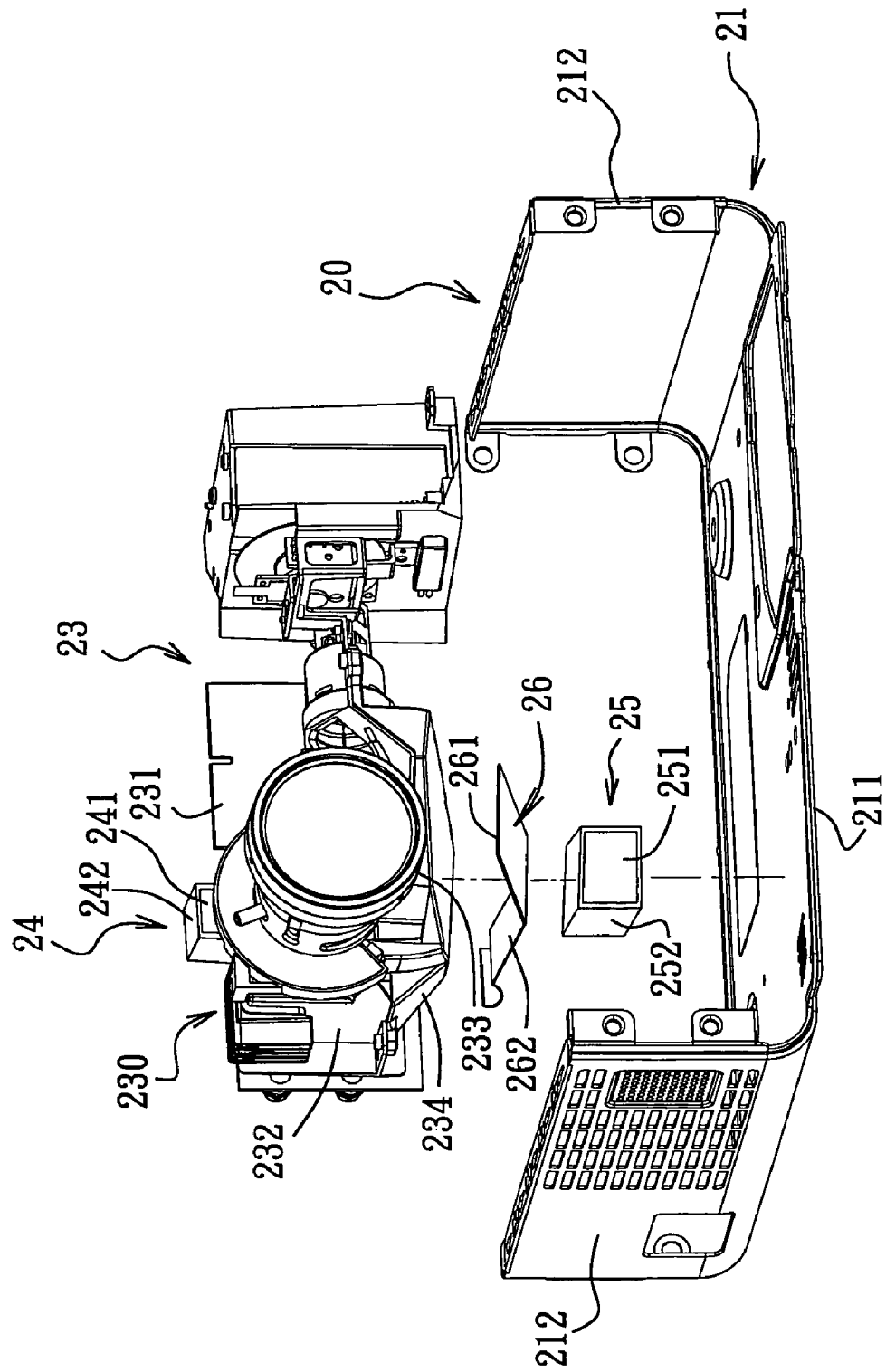
FIG. 3 is an exploded perspective view of the preferred embodiment of a projector apparatus according to the present invention.
Figure 5:
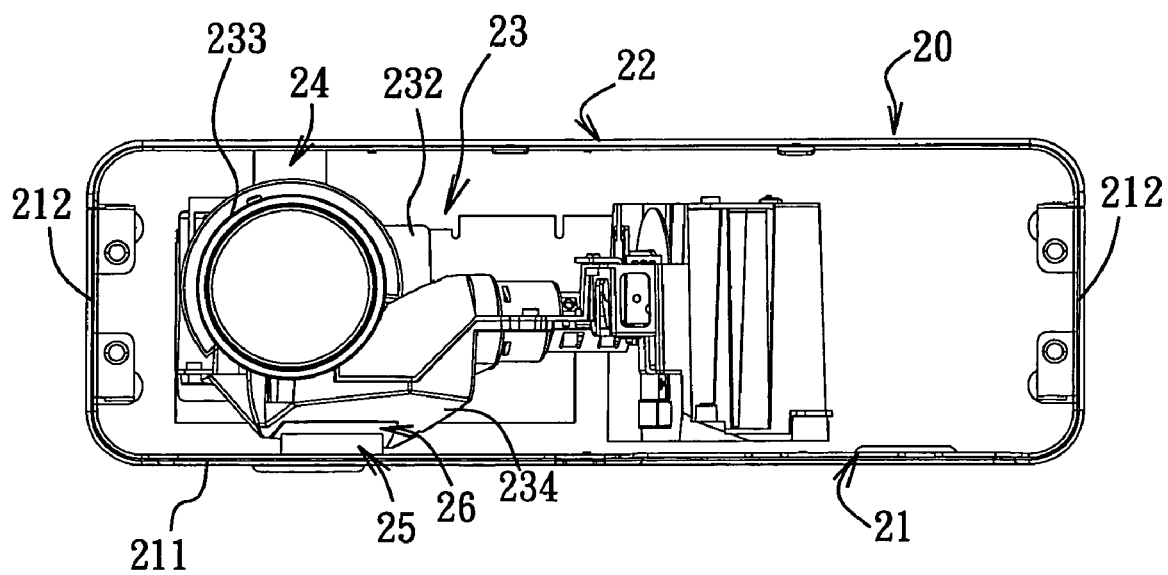
FIG. 5 is a front view of the preferred embodiment.

As shown in FIG. 3, the preferred embodiment of a projector apparatus according to the present invention includes an electrically conductive housing 20, an internal projector module 23, first and second grounding components, 24 and 25 respectively, and a conducting member 26. As shown in FIG. 5, the housing 20 includes lower and upper housing parts, 21 and 22 respectively.

The lower housing part 21 includes a bottom plate 211 and side plates 212 disposed on opposite lateral edges of the bottom plate 211. The upper housing part 22 is coupled to the lower housing part 21 and spans top edges of the side plates 212 so as to cover the lower housing part 21.

Figure 4:
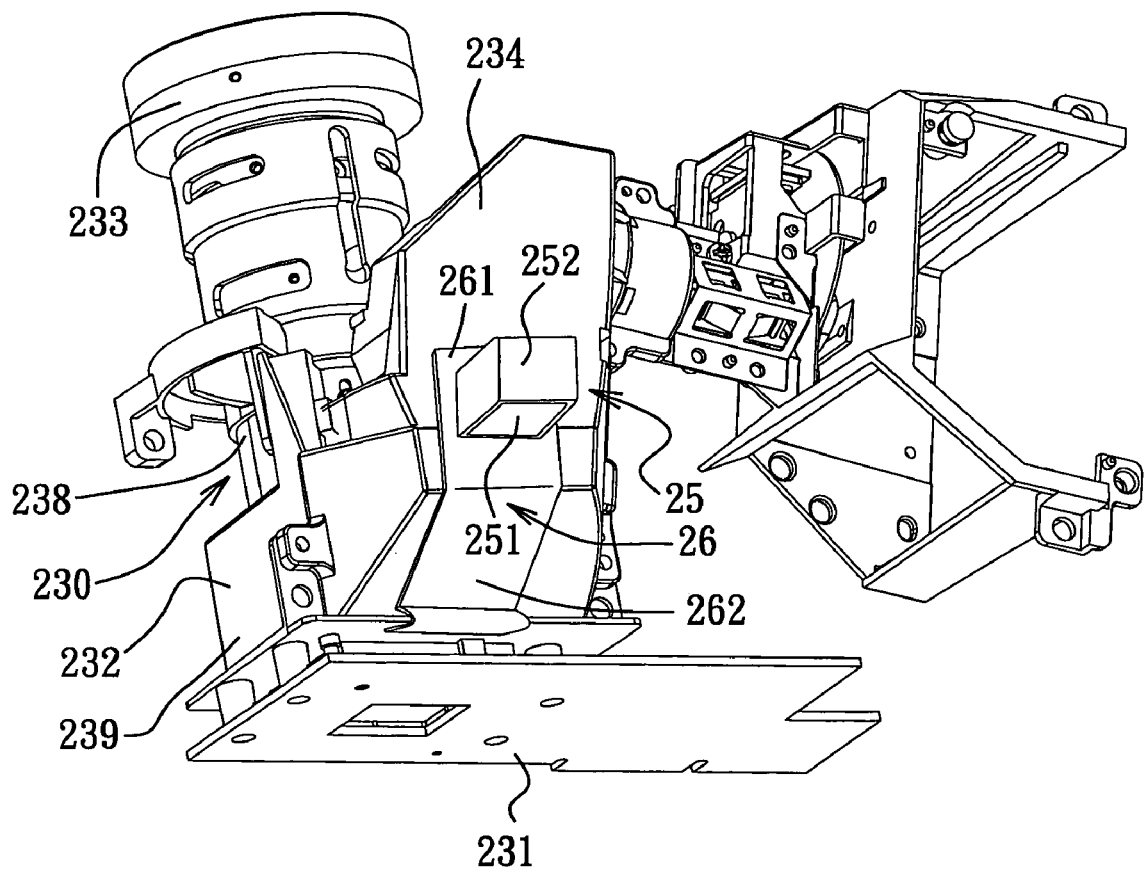
FIG. 4 is an assembled perspective view of an internal projector module of the preferred embodiment.

As shown in FIG. 3 and FIG. 4, the internal projector module 23 is mounted in the housing 20 and includes a digital light processing (DLP) optical engine 230 having an electrically conductive surface and a main support 234. In this embodiment, the optical engine 230 includes an engine base 232 having front and rear ends, 238 and 239 respectively, a digital micro-mirror device 231 mounted to the rear end 239 of the engine base 232, and a lens unit 233 mounted to the front end 238 of the engine base 232. The engine base 232 is made from an electrically conducting material and is formed with the electrically conductive surface of the optical engine 230. In this embodiment, the main support 234 is made from an electrically insulating material, is coupled to the optical engine 230 at an underside of the optical engine 230, and is disposed proximate to the bottom plate 211 of the lower housing part 21.

In this embodiment, the conducting member 26 is an electrically conductive fabric, which is made by mixing electrically conductive materials in fabric materials and is in the form of a mesh tape. The fabric has a first fabric portion 261 disposed at one end of the fabric and attached to the electrically conductive surface of the optical engine 230, and a second fabric portion 262 disposed at the other end of the fabric and attached to the main support 234, such that the optical engine 230 and the main support 234 form a conductive body. It should be noted herein that in other embodiments of the present invention, the main support 234 can be made from an electrically conductive material, in which case the conducting member 26 is no longer required.

Each of the first and second grounding components, 24 and 25 respectively, includes a core part, 241 and 251 respectively, made from a compressible material, and a contact part, 242 and 252 respectively, that is electrically conductive and that encloses the core part, 241 and 251 respectively. In this embodiment, the compressible material is a sponge material, and the contact parts, 241 and 251 respectively, are made from electrically conductive fabrics.

The first grounding component 24 is mounted on the optical engine 230 but can also be mounted on the upper housing part 22 at a position registered with the optical engine 230. In this embodiment, the first grounding component 24 is disposed above the digital micro-mirror device 231 and is sandwiched between the optical engine 230 and the upper housing part 22 when the internal projector module 23 is disposed in the housing 20 and when the upper housing part 22 covers the lower housing part 21. The second grounding component 25 is mounted on the second fabric portion 262 of the conducting member 26 and is disposed between the bottom plate 211 and the main support 234 when the internal projector module 23 is disposed in the housing 20. The second grounding component 25 can also be mounted to the bottom plate 211 at a position registered with the main support 234. In this embodiment, the second grounding component 25 is disposed at a middle part of the optical engine 230, so as to effectively ground the electromagnetic interference produced by the internal projector module 23 to the housing 20. It should be noted herein that the number of the second grounding component 25 can be made proportional to a front-to-rear distance of the optical engine 230.

As shown in FIG. 5, when the internal projector module 23 is disposed in the housing 20, not only is a first grounding path established by the first grounding component 24 between the internal projector module 23 and the upper housing part 22, but there is also a second grounding path established by the second grounding component 25 and the conducting member 26 between the internal projector module 23 and the lower housing part 21. Since the second grounding component 25 is disposed at a middle part of the optical engine 230 and extends in a front-to-rear direction relative to the optical engine 230, electromagnetic noise produced by the internal projector module 23 is grounded through the conducting member 26 and the second grounding component 25 to the housing 20 before the electromagnetic noise is radiated in the form of electromagnetic waves. It should be noted herein that in this embodiment, an additional function of the compressible core part 251 of the second grounding component 25 is to fill in gaps between the internal projector module 23 and the bottom plate 211 of the lower housing part 21 due to errors in production and assembly.

According to the present invention, the first and second grounding components, 24 and 25 respectively, are used to establish first and second grounding paths with the upper and lower housing parts, 21 and 22 respectively, so as to protect the projector apparatus against electromagnetic interference. In addition, the second grounding component 25 is provided at the middle part of the optical engine 230, and extends in a front-to-rear direction relative to the optical engine 230 so as to enhance effectiveness of the second grounding path against electromagnetic interference.

While the present invention has been described in connection with what is considered the most practical and preferred embodiment, it is understood that this invention is not limited to the disclosed embodiment but is intended to cover various arrangements included within the spirit and scope of the broadest interpretation and equivalent arrangements.

What is claimed is:

1. A projector apparatus comprising:
   an electrically conductive housing including a lower housing part and an upper housing part coupled to said lower housing part for covering said lower housing part;
   an internal projector module mounted in said housing;
   a first grounding component provided between said internal projector module and said upper housing part so as to establish a first grounding path between said internal projector module and said housing; and
   a second grounding component provided between said internal projector module and said lower housing part so as to establish a second grounding path between said internal projector module and said housing,
   wherein said lower housing part includes a bottom plate and said second grounding component is disposed between said bottom plate and said internal projector module,
   wherein said internal projector module includes an optical engine and a main support coupled to said optical engine at an underside of said optical engine and disposed proximate to said bottom plate of said lower housing part,
   wherein said main support is made from an electrical insulating material, said optical engine has an electrically conductive surface, and said projector apparatus further comprises a conducting member provided on said main support connected electrically to said electrically conductive surface of said optical engine and sandwiched between said main support and said second grounding component.

2. The projector apparatus as claimed in claim 1, wherein said conducting member is an electrically conductive fabric attached at one end to said electrically conductive surface of said optical engine and at the other end to said main support.

3. The projector apparatus as claimed in claim 1, wherein said optical engine includes an electrically conductive engine base formed with said electrically conductive surface of said optical engine.

4. The projector apparatus as claimed in claim 1, wherein at least one of said first and second grounding components includes a core part made from a compressible material and a contact part that is electrically conductive and that encloses said core part.

5. The projector apparatus as claimed in claim 4, wherein said contact part is made from an electrically conductive fabric.

6. The projector apparatus as claimed in claim 4, wherein said compressible material is a sponge material.

7. The projector apparatus as claimed in claim 1, wherein said second grounding component is disposed at a middle part of said internal projector module, and extends in a front-to-rear direction relative to said internal projector module.

8. The projector apparatus as claimed in claim 1, wherein said internal projector module includes an engine base having front and rear ends, a lens unit mounted to said front end of said engine base, and a digital micro-mirror device mounted to said rear end of said engine base.

9. The projector apparatus as claimed in claim 8, wherein said first grounding component is disposed between said digital micro-mirror device and said upper housing part.

10. The projector apparatus as claimed in claim 1, wherein said internal projector module includes a digital light processing optical engine.

* * * * *